(12) United States Patent
Duke et al.

(10) Patent No.: US 6,730,225 B1
(45) Date of Patent: May 4, 2004

(54) WASTEWATER TREATMENT SYSTEM AND METHOD

(76) Inventors: Michael L. Duke, 8455 Shelbyville Hwy., Eagleville, TN (US) 37060; Jack Fowler, 5000 Lowery Rd., Vicksburg, MS (US) 39180

( * ) Notice: Subject to any disclaimer, the term of this patent is extended or adjusted under 35 U.S.C. 154(b) by 0 days.

(21) Appl. No.: 09/946,163

(22) Filed: Sep. 4, 2001

(51) Int. Cl.$^7$ .................................................. C02F 3/30
(52) U.S. Cl. .................. 210/610; 210/620; 210/630; 210/631; 210/903; 210/170; 210/205; 210/220
(58) Field of Search .............................. 210/605, 610, 210/620, 630, 631, 747, 903, 170, 198.1, 205, 206, 220, 201, 202, 221.1, 221.2, 252, 259

(56) References Cited

U.S. PATENT DOCUMENTS

| | | | |
|---|---|---|---|
| 1,582,914 A | * 5/1926 | Farley | 210/320 |
| 3,568,838 A | * 3/1971 | Appelgren et al. | 210/136 |
| 3,923,656 A | * 12/1975 | Krebs et al. | 210/86 |
| 4,624,604 A | * 11/1986 | Wagner et al. | 405/129.7 |
| 4,668,388 A | * 5/1987 | Dibble et al. | 210/150 |
| 4,822,579 A | * 4/1989 | Wagner | 422/263 |
| 4,919,568 A | * 4/1990 | Hurley | 405/43 |
| 4,929,348 A | * 5/1990 | Rice | 210/109 |
| 4,994,391 A | * 2/1991 | Hoffmann | 435/292.1 |
| 4,997,568 A | * 3/1991 | Vandervelde et al. | 210/603 |
| 5,078,882 A | 1/1992 | Northrop | 210/602 |
| 5,287,985 A | * 2/1994 | Hatayama | 220/9.4 |
| 5,348,422 A | 9/1994 | Manchak, III et al. | 405/128 |
| 5,356,452 A | 10/1994 | Faney | 71/10 |
| 5,382,363 A | * 1/1995 | Boylen | 210/605 |
| 5,575,925 A | * 11/1996 | Logue, Jr. | 210/747 |
| 5,810,510 A | * 9/1998 | Urriola | 405/45 |
| 5,958,239 A | * 9/1999 | Sing | 210/605 |
| 5,972,219 A | 10/1999 | Habets et al. | 210/604 |
| 6,015,011 A | * 1/2000 | Hunter | 166/265 |
| 6,030,533 A | 2/2000 | Karamanev et al. | 210/610 |
| 6,063,273 A | 5/2000 | Habets et al. | 210/188 |

FOREIGN PATENT DOCUMENTS

| | | | |
|---|---|---|---|
| DE | 10258551 | * | 7/2003 |
| JP | 5-131196 | * | 5/1993 |
| JP | 9-271761 | * | 10/1997 |

* cited by examiner

Primary Examiner—Fred G. Prince
(74) Attorney, Agent, or Firm—Waddey & Patterson, PC; Howard H. Bayless; Mark J. Patterson

(57) ABSTRACT

A system and method for treating wastewater including: delivering untreated wastewater into a permeable container disposed in an impoundment. A wastewater input moves untreated wastewater to the interior of the permeable container. Treated wastewater is flowed through the permeable container and is removed via a wastewater output. A method of practicing wastewater treatment, comprising the steps of delivering untreated wastewater into a permeable container contained within an impoundment; treating the wastewater in the permeable container; moving treated wastewater from the interior of the permeable container to a position between the interior of the permeable container and the exterior of the impoundment; and removing the treated wastewater from the impoundment.

32 Claims, 7 Drawing Sheets

CROSS SECTION VIEW OF AEROBIC WASTEWATER TREATMENT SYSTEM

CONVENTIONAL WASTEWATER TREATMENT SYSTEM
(ACTIVATED SLUDGE PROCESS)

Prior Art

CROSS SECTION VIEW OF AEROBIC
WASTEWATER TREATMENT SYSTEM

CROSS SECTION VIEW OF AEROBIC WASTEWATER TREATMENT SYSTEM

PLAN VIEW OF AEROBIC
WASTEWATER TREATMENT SYSTEM

CROSS SECTION VIEW OF WASTEWATER
TREATMENT SYSTEM DURING DEWATERING

WASTEWATER TREATMENT SYSTEM AND METHOD

A portion of this patent document contains material that may be subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates generally to wastewater treatment. More particularly, this invention pertains to a system and method of treating wastewater in a single impoundment by employing an internal permeable treatment container (or a "permeable container"). The permeable container may be made of any permeable material including, but not limited to, geotextile fabric, fabric, porous concrete, sintered metal, or metallic screen.

Companies, farms, and governmental entities (such as municipalities) routinely have or receive, and subsequently treat, wastewater for re-use or discharge, the treating being performed under numerous federal and state regulations. Although configurations of wastewater treatment systems can vary widely from system to system, such systems normally operate in several stages.

In a first stage (i.e. a "permeable stage"), raw wastewater (influent) flows through a quiescent impoundment in which primary solids are allowed to settle to the bottom of the impoundment. In a second stage, the relatively solids-free wastewater then flows through a secondary treatment reactor where colloidal and soluble organic materials in the wastewater are used as a food source for a biological culture resident in the secondary treatment reactor, and the organic materials are thereby digested and converted to new cells and gaseous byproducts. This second stage may be performed aerobically or anaerobically. In aerobic treatment systems, the byproducts are new cells and carbon dioxide. In anaerobic treatment systems, the byproducts are new cells and other gaseous byproducts that may include methane, hydrogen sulfide, and nitrogen.

In a third stage, the wastewater and biological culture (biosolids) then flow through a final clarifier tank where the biosolids are allowed to separate, agglomerate, settle, and thicken. Solids-free wastewater may be discharged or undergo additional treatment. A portion of the biological cells may be returned to the secondary treatment reactor to maintain a desired mass for wastewater treatment. Excess biological solids and permeable solids may undergo additional treatment to reduce mass, reduce putrescible fraction, improve dewatering characteristics, or destroy pathogens. These solids are digested in either aerobic or anaerobic vessels. Digested solids may be then be dewatered, landfarmed, composted, incinerated or landfilled. Dewatering is typically accomplished using various means such as sand-drying beds, vacuum filters, or filter presses to filter in the water fraction from the biosolids.

The conventional wastewater treatment system as described above requires the use of three or more impoundments and a dewatering process. Each impoundment must be connected to at least one other impoundment by piping. Consequently, conventional wastewater treatment systems require substantial engineering design, construction expertise, high capital cost, and highly skilled operating personnel.

What is needed, then, is a system and method for completely treating wastewater and byproduct biosolids in a permeable container placed within a single impoundment.

SUMMARY OF THE INVENTION

This invention is a system and method that allows for the treating of wastewater within a single impoundment. Specifically, the invention is a two-part system that will contain wastewater during all of the stages of the wastewater treatment process (i.e., primary clarification, primary solids digestion, biological treatment of organics and nitrogenous compounds, final clarification, biological solids digestion, and solids dewatering). The two parts of the wastewater treatment system are a permeable container that holds the wastewater in contact with the biosolids while the wastewater is being treated, and an impoundment that holds the permeable container, its contents, and any wastewater that has already been treated. An important element of the invention is the permeable container, because it enables consolidation of multiple tanks and stages into one impoundment. This permeable container may be of any construction including, but not limited to, a woven geotextile fabric, a woven fabric, a woven synthetic fabric, a screen, or porous concrete. The permeable container is placed into the impoundment, which is a rigid container such as a tank or lagoon sufficient to completely house the permeable container and the wastewater. More than one permeable container may be housed in an impoundment.

In the method of the invention, untreated wastewater may be pumped or may flow via gravity directly into the permeable container. Air, oxygen, nutrients, or other additives may be added directly into the permeable container as well. The contents of the permeable container are completely mixed by either a recirculating pump, an aerator, or both. Biosolids grow and accumulate within the permeable container and on the container walls and provide for the following results: reduction of organic material, converting the material into new cells and gaseous byproducts; oxidation of nitrogenous compounds followed by the reduction of nitrates to nitrogen gas; and auto-oxidation of excess biological solids. The treated wastewater flows or is forced through the walls of the permeable container into the impoundment, from which it is removed by gravity or by pumping.

Eventually, the permeable container will reach the end of its useful life, as determined by deteriorating treated-wastewater quality over time. At the end of the permeable container's useful life, the permeable container will need to be removed and recycled or replaced. To remove the permeable container from the impoundment, biosolids are digested and gravity-dewatered at the end of the system's life cycle by stopping raw wastewater flow. Mixing or aeration continues for a predetermined period, then the impoundment is substantially drained of liquid, the permeable container will be allowed to drain more of its liquid contents, and the permeable container may be removed, where the remaining contents of the permeable container are allowed to dewater and desiccate.

Accordingly, it is an object of the invention to provide a system and method for treating wastewater and byproduct biosolids within a single impoundment.

It is a further object of the invention to provide a system and method for treating wastewater using a permeable material as a permeable container.

It is a further object of the invention to simplify the wastewater treatment process.

It is a further object of the invention to reduce wastewater treatment system construction cost.

It is a further object of the invention to have a wastewater treatment system that can be constructed in a short period of time.

It is a further object of the invention to reduce prerequisite skills, knowledge, and experience necessary to construct, operate, and maintain a wastewater treatment system.

It is a further object of the invention to be scalable -for any quantity of wastewater.

It is a further object of the invention to have a wastewater treatment system than can be operated in a limited land area.

In addition to the foregoing, further, objects, features, and advantages of the present invention should become more readily apparent to those skilled in the art upon a reading of the following detailed description in conjunction with the drawings, wherein there are shown and described illustrated embodiments of the invention.

DESCRIPTION OF THE PREFERRED EMBODIMENTS

Figure 1:
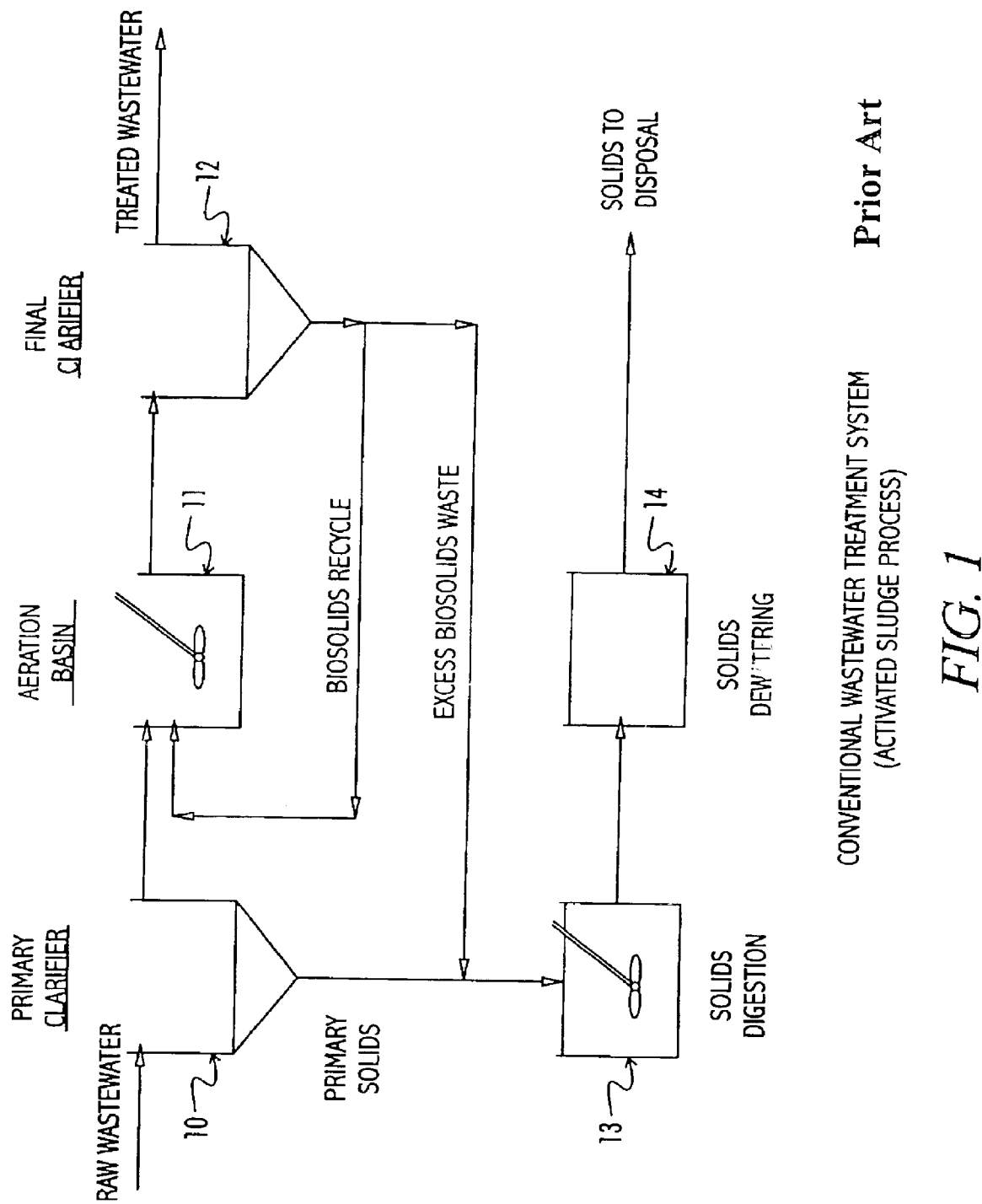
FIG. 1 is a simplified schematic of a conventional wastewater treatment system.

Referring to FIG. 1, a conventional wastewater treatment system is shown, with three typical water treatment stages, namely: a permeable clarification stage 10; an aeration biological treatment stage 11; and a final clarification stage. 12. Arrows in the diagram indicate the flow direction of the wastewater, usually through pipes. In permeable clarification stage 10, wastewater solids are allowed to settle out over a period of time. The settled solids are moved into a holding tank 13, where they are digested with or without the presence of oxygen.

Further referring to FIG. 1, wastewater is continuously moved from permeable clarification stage 10 to biological treatment stage 11, where the soluble and colloidal organic materials are utilized as a food source by a biological culture of bacteria. Additives such as nutrients may be added to the wastewater. The specific treatment requirements (such as oxygen requirement, nutrient requirement, or residence time) are prescribed for wastewater on a case-by-case basis as dictated by the composition of the wastewater.

Further referring to FIG. 1, wastewater and the biosolids flow continuously from aeration stage 11 to final clarifier stage 12. The biosolids separate from the wastewater in final clarifier stage. Excess biological solids are wasted to holding tank 13 and are further treated. Remaining solids are returned to the aeration stage 11 to maintain the desired level of biosolids. The treated wastewater is either discharged or may receive additional disinfection or additional treatment. The treated biosolids may be removed to a solids dewatering stage 14, where the biosolids are prepared for incineration, land application, or other disposal.

Figure 2:
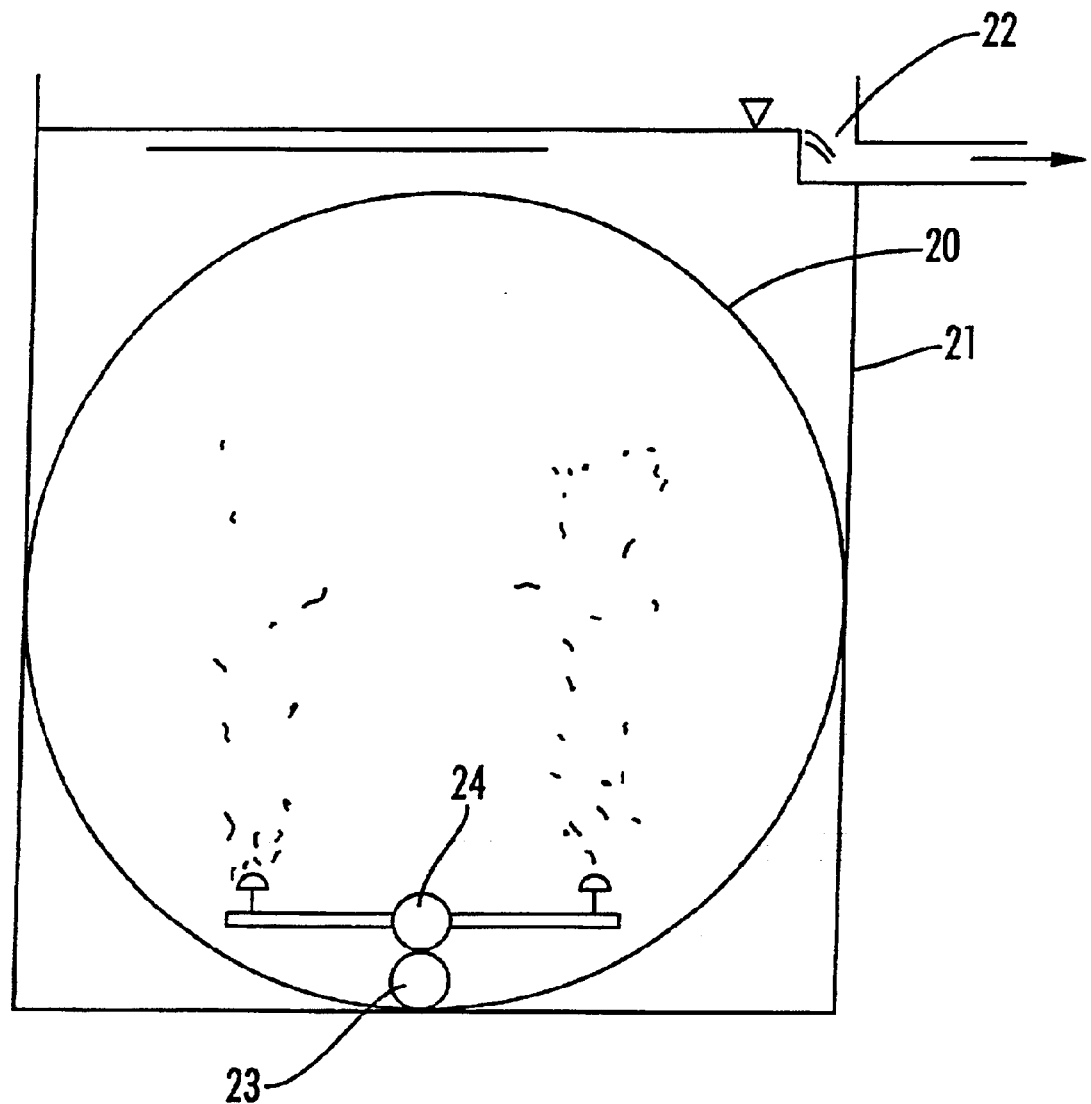
FIG. 2 is a cross-sectional view of a first embodiment of the invention.

Referring to FIG. 2, the system of the invention comprises a permeable container 20, and an impoundment 21, being of a rigid construction and of sufficient dimensions to contain the permeable container 20 and a desired amount of wastewater. While permeable container 20 is preferably made of panels of geotextile fabric that are sewn together to make essentially a closed ball-shaped bag, permeable container 20 may be made of other types of aquapermeable materials such as fabric, porous concrete, sintered metal, or metallic screen. Impoundment 21 may be a tank made of concrete, steel or plastic, or impoundment 21 may be made of earthen materials (i.e. a lagoon). Any other impoundment sufficient to contain permeable container 20 and an amount of wastewater may be suitable for use as impoundment 21. Impoundment 21 could even be a fluid-retaining membrane. Further, impoundment 21 may have an open top, or the top may be covered. If the top is covered, a vent would likely be desirable in the cover for venting gaseous byproducts from impoundment 21. Conventionally, impoundment 21 would also include a discharge line or overflow weir 22 for the controlled discharge of treated wastewater.

Continuing in FIG. 2, wastewater is delivered into the permeable container 20 via an opening 23 and preferably a piping system, which may or may not include a pump for moving the wastewater into permeable container 20. The wastewater may be aerated through a piping system including a known manifold/diffuser system 24 for distributing the air throughout permeable container 20. Other additives may be added to the wastewater in permeable container 20. For each additive, an additive delivery system would be required to apply the additives, in each case being delivered through a pipe-and-pump or other conventional additive delivery system peculiar to the additive being added. A mixing pump may also be incorporated with permeable container 20 for mixing the contents of permeable container 20 together during the treating process.

The wastewater is forced from the interior of permeable container 20 to the exterior of permeable container 20 into impoundment 21. This may be accomplished by a pressure difference (called "differential head") that forces the treated wastewater through the walls of permeable container 20 into the complement of impoundment 21. The biosolids will remain inside permeable container 20.

Figure 3:
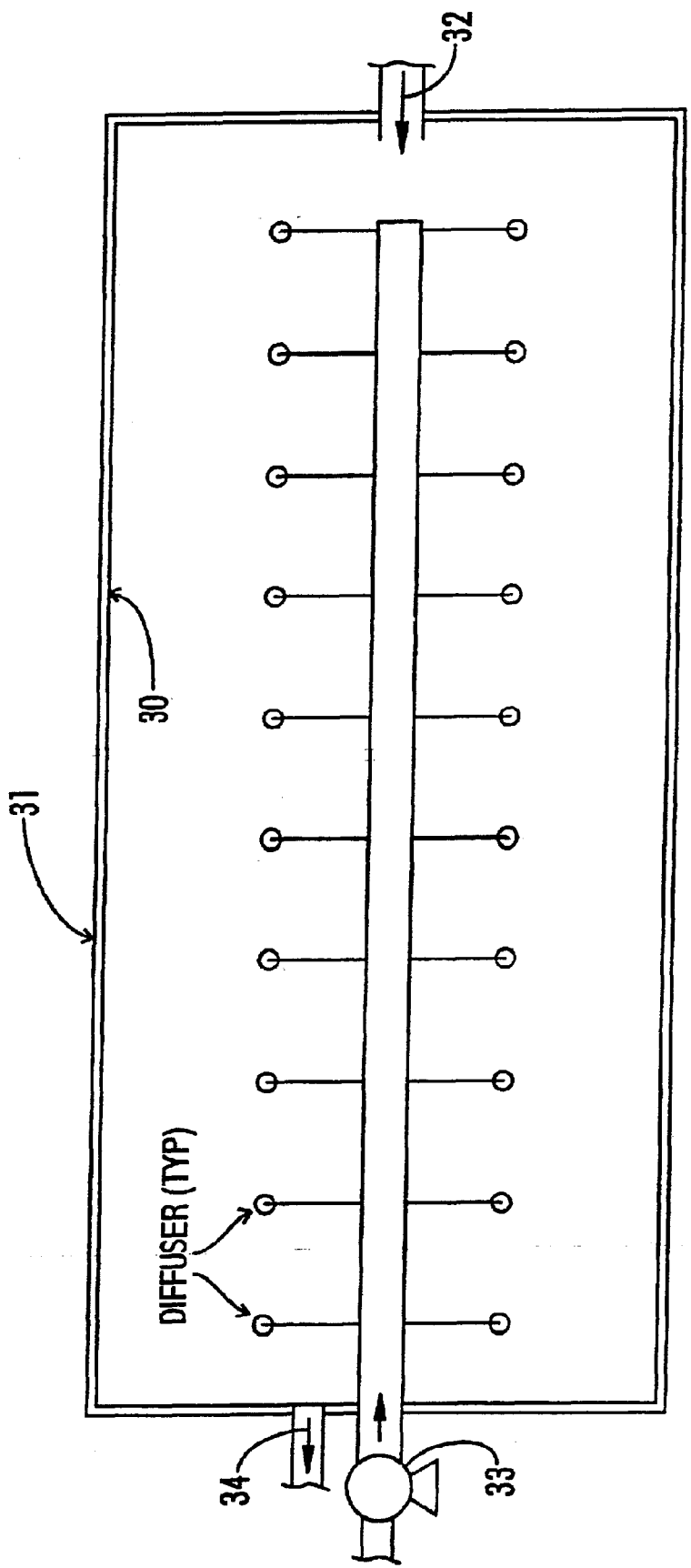
FIG. 3 is a plan view of the embodiment of the invention shown in FIG. 2.

Referring to FIG. 3, an aerobic permeable container bioreactor configuration is shown in a plan view. A permeable container 30 may be housed in a natural or artificial impoundment 31. An influent pipe 32 directs wastewater into the interior of permeable container 30. An aeration blower 33 is attached via piping to the interior manifold of permeable container 30, and is arranged to aerate the contents of permeable container 30 in a known manner. Treated wastewater is moved through the walls of permeable container 30 in the manner described above relating to FIG. 2, and an effluent pipe 34 directs treated wastewater from the upper portion of impoundment 31 that is external to permeable container 30.

Figure 4:
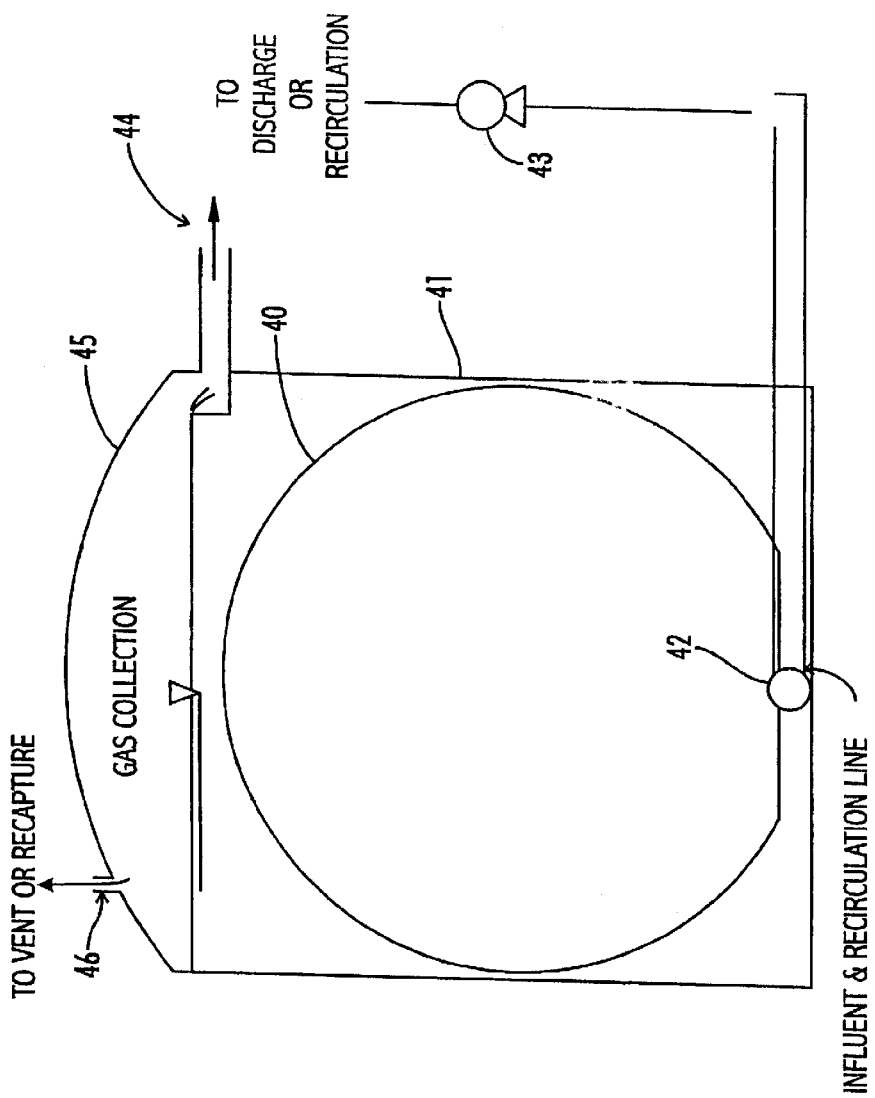
FIG. 4 is a cross-sectional view of a second embodiment of the invention.

Referring to FIG. 4, an anaerobic permeable container bioreactor configuration is shown in cross-sectional view with a permeable container 40 housed in a natural or artificial impoundment 41. An influent pipe 42 directs wastewater into the interior of permeable container 40. A recycle pump 43 is attached via piping to the interior of permeable container 40, and is arranged to mix the contents of permeable container 40 in a known manner. Treated wastewater is moved through the walls of permeable container 40 in the manner described above relating to FIG. 2, and an effluent pipe 44 directs treated wastewater from the upper portion of impoundment 41 that is external to permeable container 40. In this anaerobic treating configuration, a cover 45 is placed over the top of impoundment 41. The cover 45 may incorporate a vent 46 to allow for the release and collection of gases such as methane that are produced as a byproduct in the anaerobic wastewater treatment process.

Figure 5:
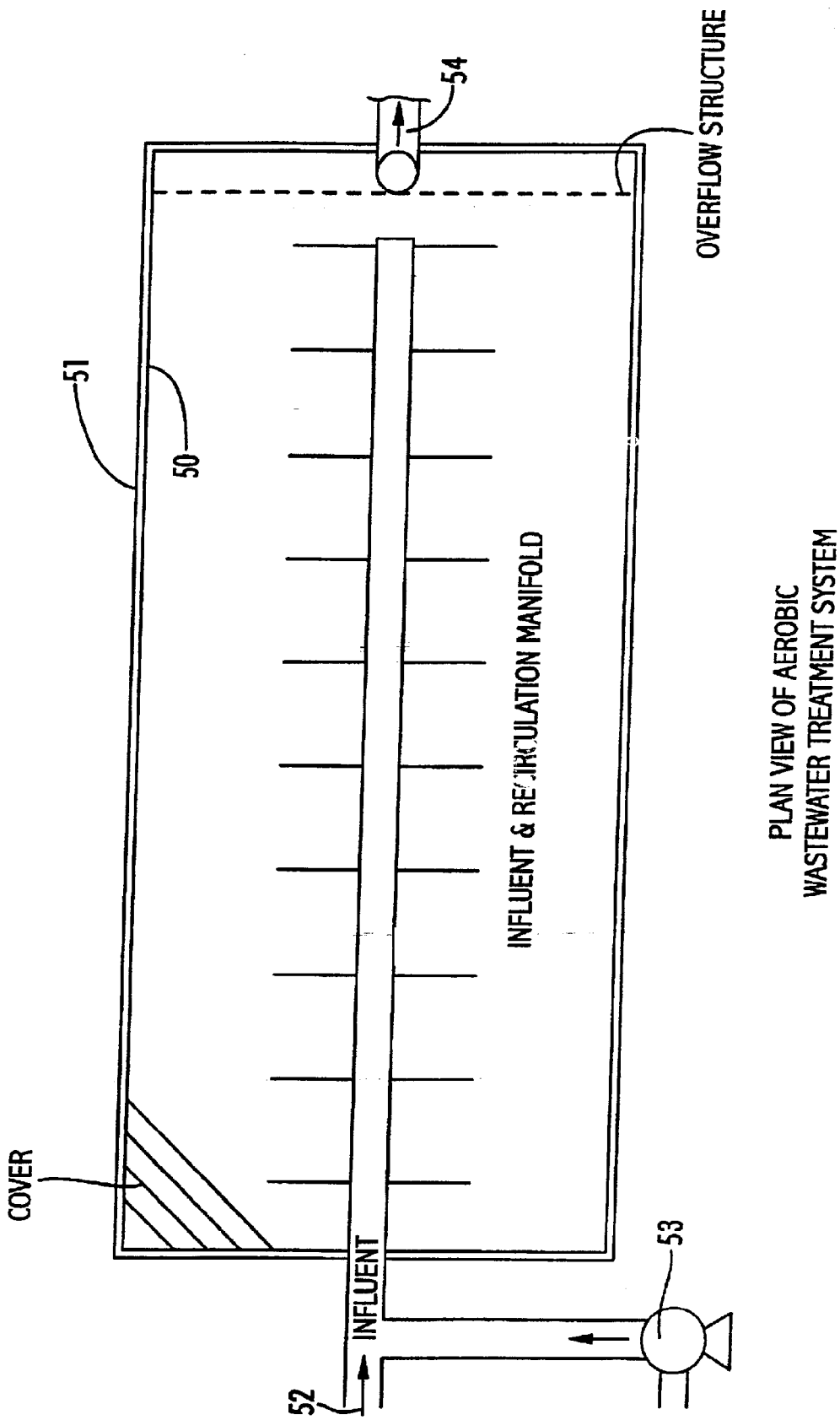
FIG. 5 is a plan view of the embodiment of the invention shown in FIG. 4.

Referring to FIG. 5, an anaerobic permeable container bioreactor configuration is shown in a plan view. A permeable container 50 may be housed in a natural or artificial impoundment 51. An influent pipe 52 directs wastewater into the interior of permeable container 50. A recycle mixer 53 is attached via piping to the interior manifold of permeable container 50, and is arranged to mix the contents of permeable container 50 in a known manner. Treated wastewater is moved through the walls of permeable container 50 in the manner described above relating to FIG. 4, and an effluent pipe 54 directs treated wastewater from the upper portion of impoundment 51 that is external to permeable container 50.

Figure 6:
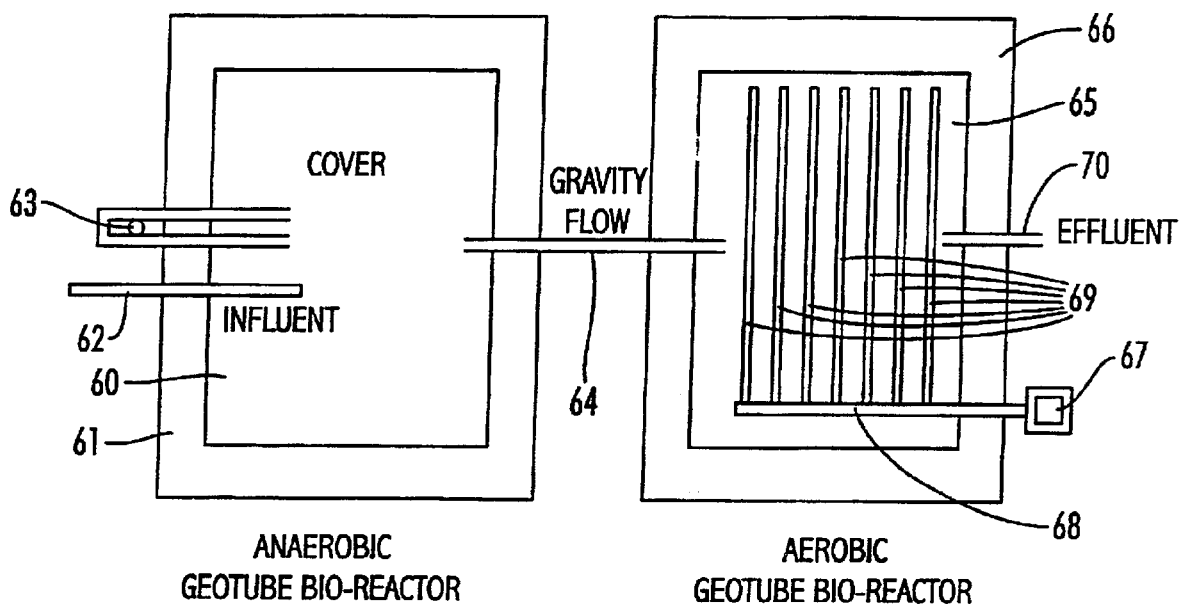
FIG. 6 is a plan view of a third embodiment of the invention.

Referring to FIG. 6, shown is a two-stage wastewater treatment system in which wastewater is first treated anaerobically, then aerobically. In the anaerobic stage, an anaerobic permeable container 60 is housed in a rigid anaerobic impoundment 61. Anaerobic impoundment 61 is covered in the same manner and for the same purposes as described above relating to FIG. 5. An influent pipe 62 directs wastewater into the interior of anaerobic permeable container 60. A recycle pump 63 is attached via piping to the interior of anaerobic permeable container 60, and is arranged to mix the contents of anaerobic permeable container 60 in a known manner. Treated wastewater is moved through the walls of anaerobic permeable container 60 in the manner described above relating to FIG. 2, and an effluent pipe 64 gravitationally directs anaerobically treated wastewater from anaerobic impoundment 61 to the aerobic stage of the system.

Further referring to FIG. 6, in the aerobic stage, an aerobic permeable container 65 is contained within an aerobic impoundment 66. An influent pipe 64 directs wastewater from anaerobic impoundment 61 into the interior of aerobic permeable container 65. An aeration pump 67 is attached via piping to a manifold 68 which in turn is connected to a series of aeration pipes 69 interior to aerobic permeable container 65. Manifold 68 and aeration pipes 69 are arranged to aerate the contents of aerobic permeable container 65 in a known manner. Treated wastewater is moved through the walls of aerobic permeable container 65 in the manner described above relating to FIG. 2, and an effluent pipe 70 directs treated wastewater from impoundment 66. Although FIG. 6 shows anaerobic treatment followed by aerobic treatment, the treatment sequence could be reversed. Since the anaerobic treatment process produces significantly less weight of sludge per pound of organic material eliminated, the arrangement of the impoundments of FIG. 6 is preferable for treating high-strength wastewater (i.e., wastewater having a relatively high amount of organic material per volume).

Figure 7:
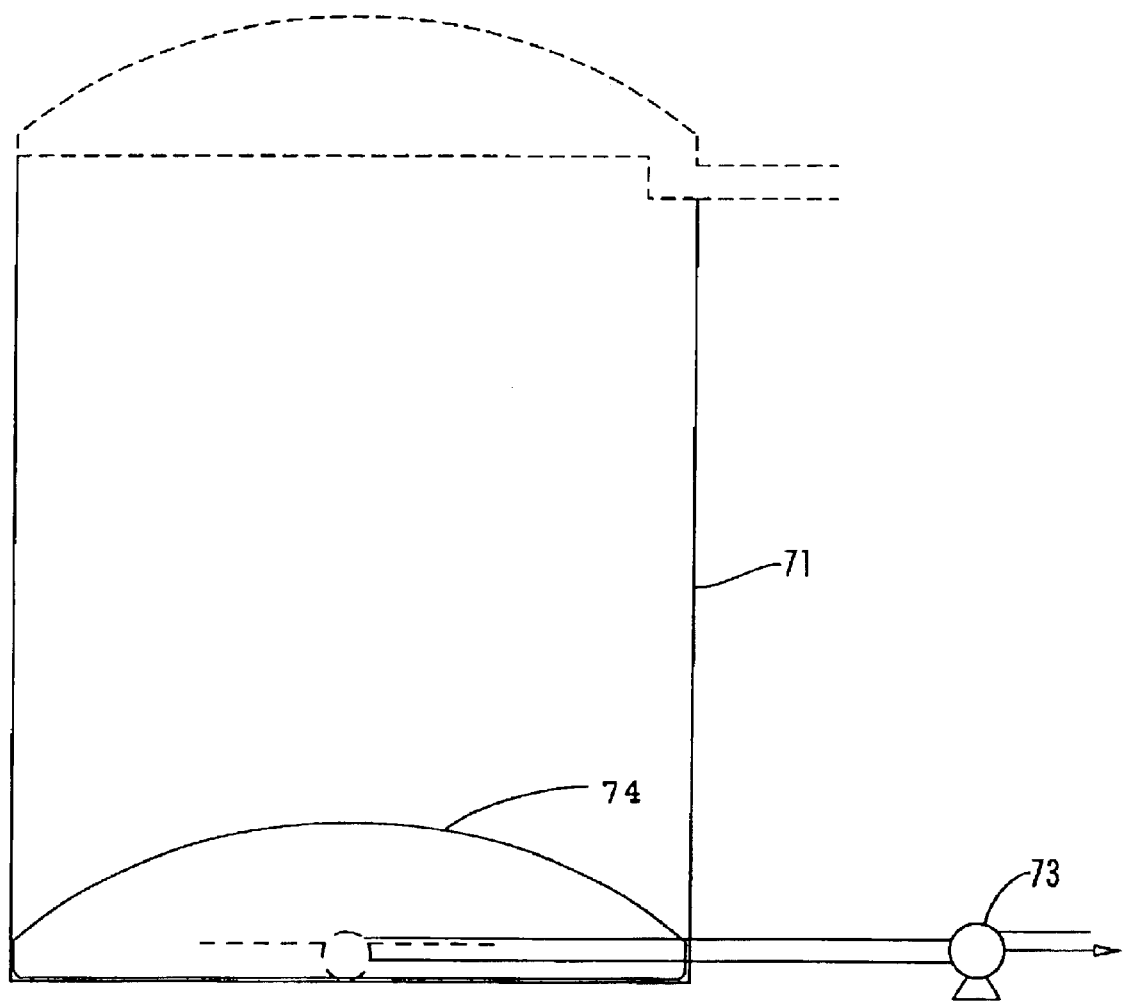
FIG. 7 is a view of the embodiments of the invention shown FIG. 2 or FIG. 4 during dewatering.

Referring to FIG. 7, a section view of an aerobic or aerobic embodiment of the invention is shown in the dewatering stage, which would be preferably performed at the end of the useful life of the permeable container. The permeable container would reach the end of its useful life when the operator of the treatment system finds that the quality or quantity of the treated wastewater has deteriorated due to factors such as excessive buildup of biosolids on the permeable container. On a case-by-case basis, the operator of the system may determine that a new permeable container would return the system to its original level of effectiveness in wastewater treatment. At this point, a permeable container 74 would be collapsed as shown from pumping the contents of the impoundment 71 via a pump or gravity drain 73. Removal of the liquid from permeable container would be performed, leaving essentially a mass of biosolids, organic materials, and inorganic materials in permeable container 74. Permeable container 74 would then be removed and the contents of permeable container would be disposed of in any conventional manner. A new permeable container 74 would then replace the removed container and wastewater would resume flow as described above.

Thus, although there have been described particular embodiments of the present invention of a new and useful Wastewater Treatment System and Method, it is not intended that such references be construed as limitations upon the scope of this invention except as set forth in the following claims.

We claim:

1. A system for treating wastewater, said system comprising:
   a wastewater inlet adapted to provide a flow of an untreated wastewater comprising primary solids and organic materials;
   a permeable container comprising a permeable wall, said permeable container having an undivided interior region, said permeable container adapted to receive said flow of said untreated wastewater within said undivided interior region, said permeable container adapted to clarify and retain said primary solids within said interior region, said permeable container adapted to biologically treat said organic materials with a biological culture resident within said interior region so as to produce biosolids and a treated wastewater, said permeable container adapted to clarify and retain said biosolids within said interior region, and said permeable container adapted to flow said treated wastewater from said interior region through said permeable wall;
   an impermeable impoundment containing said permeable container and receiving said treated wastewater; and
   a wastewater outlet adapted to flow said untreated wastewater out of said impermeable impoundment.

2. The system of claim 1, wherein the permeable wall comprises a geotextile fabric.

3. The system of claim 1, wherein the permeable container comprises a geotextile bag.

4. The system of claim 1, wherein the permeable container is made of porous concrete.

5. The system of claim 1, wherein the permeable container is made of sintered metal.

6. The system of claim 1, wherein the permeable container is made of metallic screen.

7. The system of claim 1, wherein the impoundment has an open top.

8. The system of claim 1, wherein the impoundment is made of earthen materials.

9. The system of claim 1, wherein the impoundment is made of concrete.

10. The system of claim 1, wherein the impoundment is made of steel.

11. The system of claim 1, wherein the impoundment is a fluid-retaining membrane.

12. The system of claim 1, the impoundment having an open top and the system further comprising a cover over the open top of the impoundment.

13. The system of claim 12, wherein the cover further comprises at least one vent for venting gases from the system.

14. The system of claim 1, wherein the wastewater input is a pipe.

15. The system of claim 1, wherein the wastewater input further comprises an input pump for moving the wastewater to the interior of the permeable container.

16. The system of claim 1, wherein the wastewater output is a pipe.

17. The system of claim 1, wherein the wastewater output further comprises an output pump for moving the wastewater to the exterior of the impoundment.

18. The system of claim 1, further comprising an additive for treating the wastewater.

19. The system of claim 18, wherein the additive is air.

20. The system of claim 18, wherein the additive is a nutrient.

21. The system of claim 18, wherein the additive is a chemical.

22. The system of claim 18, further comprising an additive delivery system for moving the additive from the exterior of the impoundment to the interior of the permeable container.

23. The system of claim 22, wherein the additive delivery system is a pipe.

24. The system of claim 23, the additive delivery system further comprising an additive pump for moving the additive to the interior of the permeable container.

25. The system of claim 1, further comprising a mixing pump for mixing the contents of the permeable container.

26. The system of claim 1, wherein said organic materials comprises colloidal organic materials.

27. The system of claim 1, wherein said organic materials comprises soluble organic materials.

28. The system of claim 1, wherein said untreated wastewater further comprises nitrites, and wherein said permeable container adapted to biologically treat said nitrites with a biological culture resident in said interior region so as to reduce said nitrites.

29. The system of claim 1, wherein said biological culture includes aerobic bacteria.

30. The system of claim 1, wherein said biological culture includes anaerobic bacteria.

31. A method for treating wastewater, said method comprising the steps of:
   (a) providing a permeable container having an undivided interior region;
   (b) flowing into said undivided interior region an untreated wastewater comprising primary solids and organic materials;
   (c) clarifying said primary solids in said undivided interior region;
   (d) mixing a biological culture with said wastewater so as to biologically treat said organic materials so as to produce biosolids and treated wastewater;
   (e) clarifying said biosolids in said undivided interior region;
   (f) retaining said primary solids and said biosolids in said undivided interior region; and
   (g) flowing said treated wastewater from said interior region through said permeable wall.

32. The method of claim 31 further comprising the steps of:
   receiving said permeable container and said treated wastewater within an impermeable impoundment; and
   flowing said untreated wastewater out of said impermeable impoundment.

* * * * *